(12) United States Patent
Kim et al.

(10) Patent No.: US 11,672,391 B2
(45) Date of Patent: Jun. 13, 2023

(54) ROBOT CLEANER AND METHOD FOR DETERMINING CLEANING PATH

(71) Applicant: LG ELECTRONICS INC., Seoul (KR)

(72) Inventors: Eu Gene Kim, Anyang-si (KR); Kwan Young Son, Seoul (KR); Hyun Seob Lee, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 784 days.

(21) Appl. No.: 16/719,756

(22) Filed: Dec. 18, 2019

(65) Prior Publication Data

US 2021/0093134 A1    Apr. 1, 2021

(30) Foreign Application Priority Data

Oct. 1, 2019    (KR) .......................... 10-2019-0121816

(51) Int. Cl.
*A47L 9/00* (2006.01)
*A47L 9/28* (2006.01)
*G05D 1/02* (2020.01)

(52) U.S. Cl.
CPC ............. *A47L 9/009* (2013.01); *A47L 9/2805* (2013.01); *A47L 9/2852* (2013.01); *G05D 1/0214* (2013.01); *G05D 1/0219* (2013.01); *A47L 2201/04* (2013.01); *G05D 2201/0203* (2013.01); *G05D 2201/0215* (2013.01)

(58) Field of Classification Search
CPC ..... A47L 9/009; A47L 9/2805; A47L 2201/04
See application file for complete search history.

(56) References Cited

U.S. PATENT DOCUMENTS

| | | | |
|---|---|---|---|
| 11,150,666 B2* | 10/2021 | Noh | .......................... B25J 5/007 |
| 11,467,602 B2* | 10/2022 | Passot | .................. A47L 11/4061 |
| 2014/0312813 A1* | 10/2014 | Murchie | .................... H02P 6/34 |
| | | | 318/400.03 |
| 2018/0354132 A1* | 12/2018 | Noh | ........................ B25J 9/1666 |
| 2020/0345191 A1* | 11/2020 | Furuta | .................... A47L 9/2889 |
| 2021/0370511 A1* | 12/2021 | Hong | .................... A47L 11/4061 |

FOREIGN PATENT DOCUMENTS

| | | | | | |
|---|---|---|---|---|---|
| EP | | 2725443 A2 * | 4/2014 | ............... | A47L 1/02 |
| EP | | 2977844 A1 * | 1/2016 | ........... | A47L 11/4011 |
| KR | 10-2018-0134683 | | 12/2018 | | |

* cited by examiner

*Primary Examiner* — Marc Carlson

(74) *Attorney, Agent, or Firm* — Lee, Hong, Degerman, Kang & Waimey PC

(57) ABSTRACT

Provided are a robot cleaner using an artificial intelligence (AI) and/or machine learning algorithm in a 5G environment connected for the Internet of Things and a method for determining a cleaning path of a robot cleaner. The method for determining a cleaning path includes detecting an obstacle, identifying a type of the obstacle based on the image signal, generating a cleaning map including information on the identified obstacle, providing the cleaning map to a user terminal, receiving an input of a cleaning pattern for an area of the obstacle from the user terminal, and determining a cleaning path including the cleaning pattern for the area of the obstacle.

16 Claims, 9 Drawing Sheets

| TYPE OF OBJECT | POSSIBILITY OF MOVEMENT |
|---|---|
| WALL | 0% |
| KITCHEN SINK | 5% |
| DINING TABLE | 15% |
| CARPET | 30% |
| CHAIR | 70% |
| CLOTHES | 100% |
| BAG | 100% |
| CURTAIN | 20% |
| ⋮ | ⋮ |

FIG. 5

ROBOT CLEANER AND METHOD FOR DETERMINING CLEANING PATH

CROSS-REFERENCE TO RELATED APPLICATION

Pursuant to 35 U.S.C. § 119(a), this application claims the benefit of earlier filing date and right of priority to Korean Patent Application No. 10-2019-0121816, filed on Oct. 1, 2019, the contents of which are hereby incorporated by reference herein in its entirety.

BACKGROUND

1. Technical Field

The present disclosure relates to a robot cleaner, and more particularly, to a robot cleaner capable of efficiently managing a cleaning map and determining a cleaning path.

2. Description of Related Art

A robot cleaner is a vacuum cleaner that sucks dust or debris on a driving path while driving by itself. For more efficient cleaning, the robot cleaner generates a cleaning map and determines an efficient cleaning path on the cleaning map by itself. In addition, the robot cleaner provides a function of allowing a user to directly set a cleaning path on a map. For example, a user may communicate with a robot cleaner through a user terminal, and set a cleaning path on a map provided by the robot cleaner.

Korean Patent Application Publication No. 10-2018-0134683 (related art 1) discloses a robot cleaner that acquires images while driving, recognizes attributes of a space in which the images are acquired in a similar manner to how a user recognizes the attributes of the space, and generates the map to which the attributes of the space are reflected. Related art 1 discloses that the user is provided with the attributes of the space together with the cleaning map so that the user may easily understand the cleaning map and control the robot cleaner in a user-friendly manner.

Existing robot cleaners drive in such a manner that they avoid obstacles in a cleaning area, and therefore may not clean or may inefficiently clean a complicated area such as between legs of a chair. In addition, existing robot cleaners do not consider the possibility of movement of obstacles in the cleaning area. Therefore, when the obstacles move, the preset cleaning path may not be effectively determined.

SUMMARY OF THE INVENTION

An aspect of the present disclosure is to provide a robot cleaner capable of efficiently managing a cleaning path according to a possibility of movement of obstacles present in the cleaning area.

Another aspect of the present disclosure is to provide a cleaning map to a user in a user-friendly manner.

Still another aspect of the present disclosure is to provide various user input functions to a user to determine efficiently a cleaning path.

The present disclosure is not limited to the above-described aspects, and other aspects and advantages of the present disclosure can be appreciated by those skilled in the art based on the following description and will be understood more clearly from embodiments of the present disclosure. It is also to be understood that the aspects of the present disclosure may be realized by means and combinations thereof set forth in claims.

In a robot cleaner and a method for determining a cleaning path according to embodiments of the present disclosure, a cleaning map including a location and a type of an obstacle on a cleaning area is generated, the generated cleaning map is provided to a user terminal, a user input associated with the cleaning path is received from the user, and the cleaning path is determined based on the user input.

According to an embodiment of the present disclosure, a method for determining a cleaning path of a robot cleaner includes detecting an obstacle based on at least one of an obstacle sensor signal from an obstacle sensor or an image signal from an image sensor, identifying a type of the obstacle based on the image signal, generating a cleaning map including information on the identified obstacle, the information on the obstacle including a location of the obstacle and the type of the obstacle, providing the cleaning map to a user terminal, receiving an input of a cleaning pattern for an area of the obstacle from the user terminal, and determining a cleaning path including the cleaning pattern for the area of the obstacle.

According to another embodiment of the present disclosure, a robot cleaner includes an image sensor configured to generate an image signal by capturing a surrounding image, an obstacle sensor configured to generate an obstacle sensor signal including at least one of a location of the obstacle, a direction of the obstacle, or a distance to the obstacle by detecting the surrounding obstacle, a network interface configured to communicate with a user terminal, and a controller. The controller is configured to detect an obstacle based on at least one of the obstacle sensor signal or the image signal, identify a type of the obstacle based on the image signal, generate a cleaning map including information on the identified obstacle, the information on the obstacle including a location of the obstacle and the type of the obstacle, provide a cleaning map to a user terminal through the network interface, receive an input of a cleaning pattern for an area of the obstacle from the user terminal, and determine a cleaning path including the cleaning pattern for the area of the obstacle.

The cleaning map is shown on the user terminal along with an image associated with the identified obstacle, in which the image associated with the obstacle is shown at a location on the cleaning map corresponding to the location of the obstacle.

The cleaning map further includes information on a fixed obstacle and information on an unfixed obstacle. The information on the fixed obstacle includes a display of the fixed obstacle and a location of the fixed obstacle, and the information on the unfixed obstacle includes a display of the unfixed obstacle and a location of the unfixed obstacle.

A sensor signal is obtained using at least one of the obstacle sensor or the image sensor during driving for cleaning, in which an acquisition frequency of the sensor signal for the location of the fixed obstacle is lower than that of the sensor signal for the location of the unfixed obstacle.

The cleaning map further includes information on a temporary obstacle, in which the information on the temporary obstacle includes a display of the temporary obstacle and a location of the temporary obstacle, and the cleaning path is determined to allow the robot cleaner to pass through the area of the temporary obstacle.

A change in the location of the obstacle to which the cleaning pattern is assigned is detected, and the cleaning path is modified by applying the cleaning pattern for the area of the obstacle to the changed location.

A user input for setting the cleaning path is received from the user terminal, in which the setting of the cleaning path includes setting of at least one of a cleaning order of a plurality of sections in a cleaning area or a driving pattern in the cleaning area, and the cleaning path is determined based on at least a part of the user input.

The user input for modifying the cleaning area of the cleaning map is received from the user terminal, in which the modifying of the cleaning area includes at least one of including an additional area in the cleaning area or excluding a part of the cleaning area from the cleaning area.

In response to a determination that the robot cleaner is unable to enter the additional area based on at least one of the image signal or the obstacle sensor signal, a message requesting the user terminal to confirm the entry of the robot cleaner into the additional area is transmitted.

According to embodiments of the present disclosure, it is possible to provide a robot cleaner capable of efficiently managing a cleaning path according to the possibility of movement of obstacles present in a cleaning area.

According to the embodiments of the present disclosure, the obstacles in the cleaning area are shown in the cleaning map as images, such that the cleaning map can be provided to the user in the user-friendly manner.

According to the embodiments of the present disclosure, it is possible to provide various user-preferred cleaning methods by allowing the user to set a cleaning pattern for an area where obstacles are present, cleaning patterns for sections of the cleaning area, or a cleaning order of the plurality of sections.

Various other effects will be explicitly or implicitly described in the detailed description according to the embodiments of the present disclosure to be described below.

BRIEF DESCRIPTION OF THE DRAWINGS

The above and other aspects, features, and advantages of the present disclosure will become apparent from the detailed description of the following aspects in conjunction with the accompanying drawings, in which:

FIG. 5 is a diagram illustrating an example of an object attribute database according to an embodiment of the present disclosure;

DETAILED DESCRIPTION

Figure 1:
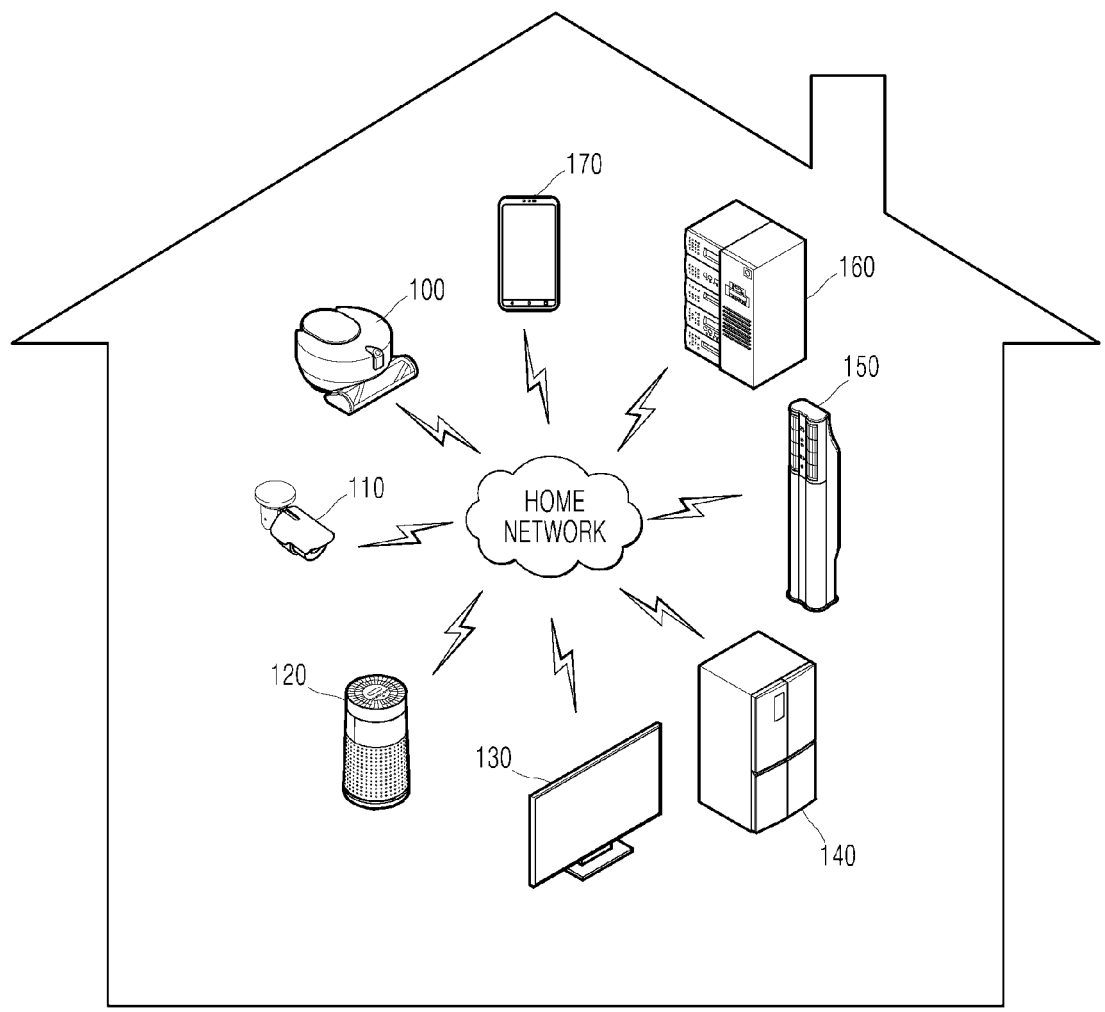
FIG. 1 is a diagram illustrating an example of an indoor environment in which a robot cleaner according to an embodiment of the present disclosure is disposed.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the articles "a," "an," and "the," include plural referents unless the context clearly dictates otherwise. The terms "comprises" "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms "ordinal numbers" such as first, second and the like are used to describe various structural elements, the structural elements should not be defined by the terms. These terms are generally used only to distinguish one element from another.

As described herein, an ANN is a data processing system modelled after the mechanism of biological neurons and interneuron connections, in which a number of neurons, referred to as nodes or processing elements, are interconnected in layers. ANNs are models used in machine learning, and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections, and acquires problem-solving capability as the strengths of synaptic interconnections are adjusted throughout training. An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

An ANN may include a deep neural network (DNN). Specific examples of the DNN include a convolutional neural network (CNN), a recurrent neural network (RNN), a deep belief network (DBN), and the like, but are not limited thereto.

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an ANN trained using training data may be referred to as a trained model.

Hereinbelow, learning paradigms of an ANN will be described in detail.

Learning paradigms, in which an ANN operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an ANN can be trained with training data that has been given a label.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

Throughout the present specification, assigning one or more labels to training data in order to train an ANN may be referred to as labeling the training data with labeling data.

Training data and labels corresponding to the training data together may form a single training set, and as such, they may be inputted to an ANN as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the ANN may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Hereinafter, embodiments of the present disclosure will be described in detail with reference to the accompanying drawings. Like reference numerals designate like elements throughout the specification, and overlapping descriptions of the elements will be omitted.

FIG. 1 illustrates an example of an indoor environment in which a robot cleaner according to an embodiment of the present disclosure is disposed. Referring to FIG. 1, by way of example, the indoor environment is a home area. Home appliances are disposed in the indoor environment. The home appliances have network functionality and are connected to a home automation server 160, a user terminal 170, and/or other home appliances in a wireless or wired manner to form a home network. Hereinafter, a home appliance that has network functionality and is connected to the home automation server 160, the user terminal 170, and/or other home appliances to form the home network is referred to as a "home IoT device".

FIG. 1 illustrates a robot cleaner 100, a security camera 110, an air cleaner 120, a TV 130, a refrigerator 140, and an air conditioner 150 as examples of home IoT devices, but the home IoT devices are not limited thereto.

The home IoT device includes a network interface for communicating with the home automation server 160 and/or other home IoT devices, and the network interface includes, for example, at least one of fifth generation (5G) cellular network, Bluetooth, infrared data association (IrDA), Internet of Things (IoT), local area network (LAN), low power network (LPN), low power wide area network (LPWAN), personal area network (PAN), radio frequency identification (RFID), ultra-wide band (UWB), wireless fidelity (Wi-Fi), wireless LAN (WLAN), or ZigBee communication technologies, but is not limited thereto.

The home IoT device may communicate with the home automation server 160 and/or other home IoT devices, either directly or via one or more intermediary devices. The intermediate device may be any of the home IoT devices described above, or may be the home automation server 160, or separate network devices such as a gateway, a hub, a switch, a router, a small cell, a femtocell, a picocell, or a wireless access point (WAP).

The home IoT devices may identify their absolute location at a relative location (for example, direction and/or distance) or in an indoor environment with other home IoT devices through communication with each other. For example, the home IoT devices may receive a beacon signal from other home IoT devices or from the access point, and may use signal strength, a received timestamp, latency, or the like of the beacon signal to estimate directions and distances to other devices. If a location of any one of the devices is known, then the location of the home IoT device can be determined from the direction and distance to the device. The home automation server 160 may collect location information from the home IoT devices and identify the locations of the home IoT devices in the indoor environment. In another embodiment, the home automation server 160 may also identify the locations of the home IoT devices in the indoor environment by manual input by a user.

One or more home IoT devices may include one or more sensors capable of detecting their ambient conditions, and may share sensor signals generated using the sensors with the home automation server 160 or other home IoT devices. In particular, the security camera 110 includes an image sensor capable of acquiring an indoor image and generating an image signal. The home appliances such as the air cleaner 120, the TV 130, the refrigerator 140, or the air conditioner 150 may also include an image sensor capable of detecting surrounding images to execute image-based functions.

The home automation server 160 is connected to one or more home IoT devices and/or user terminals 170 installed in the indoor environment to establish a home network, and receive and manage sensor signals (for example, image signal) from one or more home IoT devices connected to the home network. The user terminal 170 may be, for example, a mobile phone, a tablet computer, a laptop computer, a palmtop computer, a desktop computer, or a smart TV, but is not limited thereto.

The home automation server 160 may control operations of home IoT devices connected to the home network. The home automation server 160 may transmit a control signal to one or more home IoT devices connected to the home network to control the operations of the home IoT devices. In particular, the home automation server 160 transmits a cleaning schedule including a cleaning start time, a cleaning duration, a cleaning repetition count, and suction strength to the robot cleaner 100, so the robot cleaner 100 may perform cleaning according to a schedule and a path set by the home automation server 160.

The user terminal 170 may control the operations of the home IoT devices connected to the home network. The user terminal 170 may transmit a control signal for controlling the operations of one or more home IoT devices connected to the home network to the home IoT device or to the home automation server 160. In particular, the user terminal 170 transmits a cleaning schedule including the cleaning start time, the cleaning duration, the cleaning repetition count, and the suction strength to the robot cleaner 100 via the home automation server 160 or directly, so the robot cleaner 100 may perform cleaning according to the schedule set by the user terminal 170.

Figure 2:
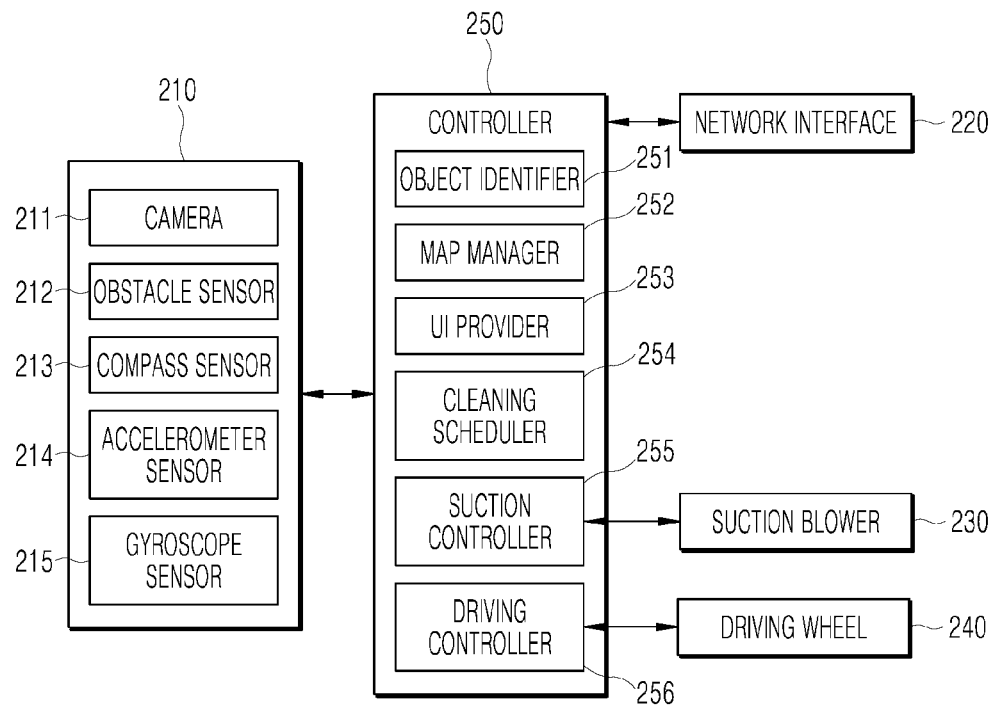
FIG. 2 is a schematic block diagram of a robot cleaner according to an embodiment of the present disclosure.

FIG. 2 is a schematic block diagram of the robot cleaner according to an embodiment of the present disclosure. The robot cleaner 100 includes a plurality of sensors 210, a network interface 220, a suction blower 230, a driving wheel 240, and a controller 250.

The plurality of sensors 210 may generate sensor signals by monitoring a state around the robot cleaner and a driving state of the robot cleaner, and provide the generated sensor signals to the controller 250.

The sensors 210 include a camera 211 for obtaining the surrounding image to generate the image signal. The sensors 210 includes an obstacle sensor 212 that detects an existence of obstacles such as walls or furniture by using infrared rays, ultrasonic waves, or lasers, and generates obstacle sensor signals including information on distances and directions to the obstacles.

The sensors 210 further includes a compass sensor 213 for detecting an orientation of the robot cleaner 100, an accelerometer sensor 214 for detecting a linear movement of the robot cleaner 100, and a gyroscope sensor 215 for detecting a rotational movement of the robot cleaner 100. The sensors 210 may be disposed at any locations suitable to achieve functions.

The network interface 220 provides network functionality for communicating with at least one of the home automation server 160, the user terminal 170, or the home IoT device. The network interface 220 may receive the sensor signals (for example, image signals) from the home IoT devices, and receive the control signal from the home automation server 160.

The network interface 220 includes, for example, at least one of fifth generation (5G) cellular network, Bluetooth, infrared data association (IrDA), Internet of Things (IoT), local area network (LAN), low power network (LPN), low power wide area network (LPWAN), personal area network (PAN), radio frequency identification (RFID), ultra-wide band (UWB), wireless fidelity (Wi-Fi), wireless LAN (WLAN), or ZigBee communication technologies, but is not limited thereto.

The suction blower 230 is configured to suck air through, for example, a nozzle located at the bottom of the robot cleaner 100, by the control of a suction controller 255. The suction blower 230 sucks air and sucks dust or debris together with air, and collects the sucked dust or debris in a dust bag.

The driving wheel 240 is configured to move or rotate the robot cleaner 100 on a floor in a straight line or in a curve by a control of a driving controller 256. The driving wheel 240 typically consists of a pair of wheels at the bottom of the robot cleaner 100.

The controller 250 interacts with the plurality of sensors 210, the network interface 220, the suction blower 230, and the driving wheel 240 to control the operation of the robot cleaner 100. The controller 250 is configured to receive the sensor signals from one or more sensors 210. The controller 250 is configured to receive the sensor signal (for example, image signal) from another home IoT device via the network interface 220. The controller 250 is also configured to control the operations of the suction blower 230 and the driving wheel 240.

The controller 250 may include, for example, one or more processors having a structured circuit for performing functions represented by codes or instructions included in, for example, a program stored in a memory. The one or more processors may be, for example, one or more of a microprocessor, a central processing unit (CPU), a processor core, a multiprocessor, an image processor, a neural processor, an application-specific integrated circuit (ASIC), or a field programmable gate array (FPAG), but is not limited thereto. Codes or instructions included in a program stored in a memory may be implemented to perform the operation of the controller 250 when executed by one or more processors.

The controller 250 includes an object identifier 251, a map manager 252, a user interface (UI) provider 253, a cleaning scheduler 254, a suction controller 255, and a driving controller 256. The components of the controller 250 may each be implemented by separate processors and memories, or at least some of the components of the controller 250 may be implemented by logical resource allocation of a common processor and memory.

The object identifier 251 is configured to analyze an image signal received from the camera 211 or other home IoT devices (for example, the security camera 110) of the robot cleaner 100, and identify an object included in the image signal. Hereinafter, the term "image sensor" should be understood to include the camera 211 included in the robot cleaner 100 and other home IoT devices (for example, security camera 110) capable of generating the image signals.

Figure 3:
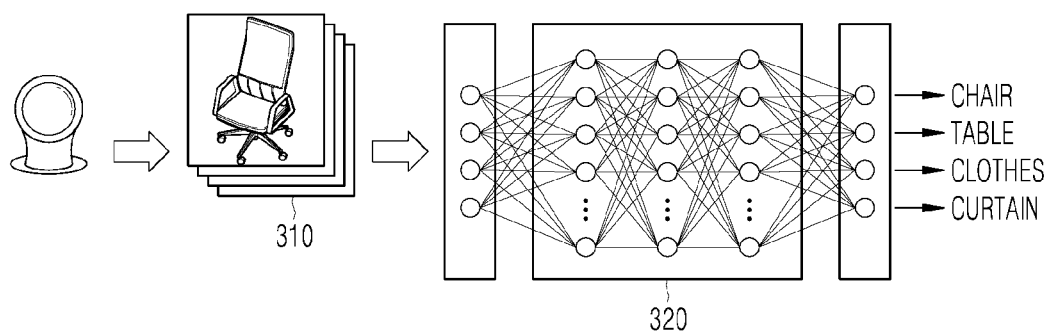
FIG. 3 is a diagram illustrating an example of an operation of an object identifier according to an embodiment of the present disclosure.

FIG. 3 illustrates an example of an operation of an object identifier according to an embodiment of the present disclosure. Referring to FIG. 3, the object identifier 251 includes an artificial neural network 320 that has been trained in advance using machine learning to identify a type of objects in the image from the image signal 310. For example, the artificial neural network 320 of the object identifier 251 is trained to identify objects existing in the image signal 310 provided from the image sensor, such as a chair, a table, clothes, a curtain, or a carpet.

The map manager 252 is configured to generate and update a cleaning map that defines a cleaning area. The map manager 252 includes information on obstacles identified by the object identifier 251 in the cleaning map.

The UI provider 253 is configured to provide a user interface for providing information to the user and receiving a user input through the user terminal 170. The UI provider 253 provides the cleaning map to the user terminal 170, and provides the user interface for receiving the user input for setting the cleaning area or the cleaning path.

The cleaning scheduler 254 is configured to determine the cleaning schedule including the cleaning path, the cleaning start time, the cleaning duration, the cleaning repetition count, and the suction strength based on the cleaning map generated by the map manager 252 and the user input entered through the UI provider 253. The cleaning scheduler 254 may determine the cleaning path passing through the plurality of sections in the cleaning area according to the cleaning order of the plurality of sections set by the user. The cleaning scheduler 254 may determine the cleaning path passing through each section according to cleaning patterns in each section set by the user. The cleaning scheduler 254 may determine the cleaning path based on the possibility of movement and the possibility of cleaning of obstacles existing on the cleaning map.

The suction controller 255 is configured to control the operation (for example, suction strength) of the suction blower 230. The suction controller 255 controls the operation of the suction blower 230 according to the cleaning schedule set by the cleaning scheduler 254. The suction controller 255 may control the operation of the suction blower 230 according to a user's setting through the UI provider 253. The suction controller 255 may control the operation of the suction blower 230 according to the control signal from the home automation server 160 or the user terminal 170.

The driving controller 256 is configured to control the operation (for example, driving direction and speed) of the driving wheel 240. The driving controller 256 is also configured to generate the information (for example, driving direction and speed information) on the operation of the driving wheel 240 during the operation of the driving wheel 240.

The driving controller 256 controls the operation of the driving wheel 240 according to the cleaning schedule set by the cleaning scheduler 254. The driving controller 256 may control the operation of the driving wheel 240 based on the cleaning map generated by the map manager 252 and the location of the robot cleaner 100. The driving controller 256 may control the operation of the driving wheel 240 according to the control signal from the home automation server 160 or the user terminal 170.

Figure 4:
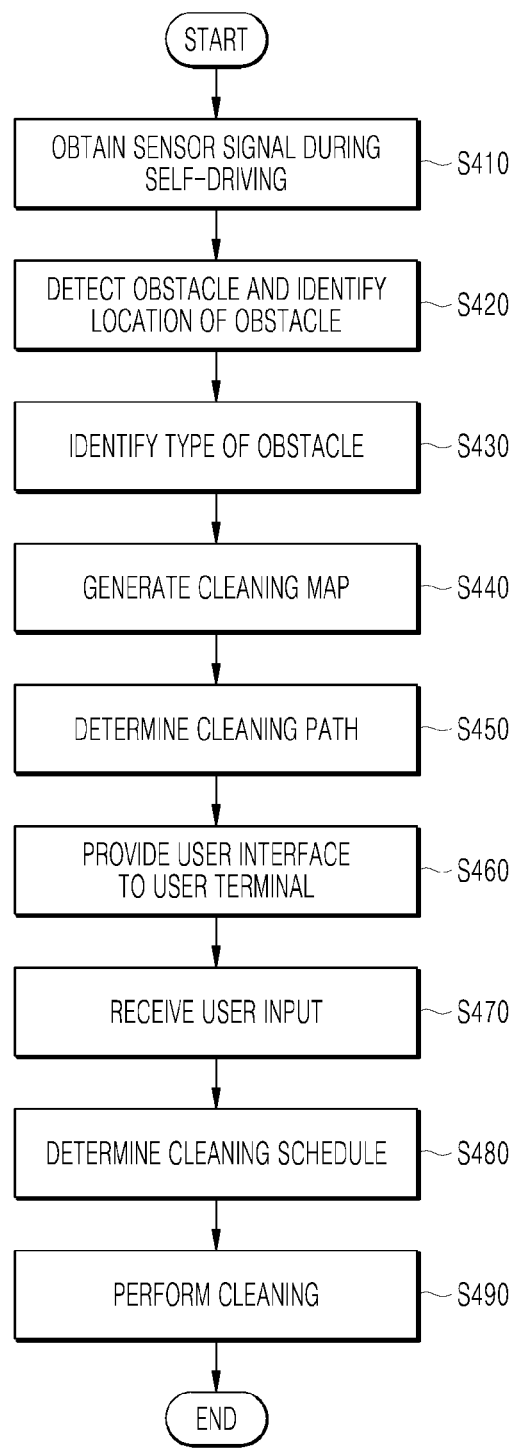
FIG. 4 is a flowchart illustrating an exemplary method for generating a cleaning map and setting a cleaning path according to an embodiment of the present disclosure.

FIG. 4 is a flowchart illustrating an exemplary method for generating a cleaning map and setting a cleaning path according to an embodiment of the present disclosure.

In step S410, the controller 250 collects information for generating the cleaning map while the robot cleaner 100 drives through an unknown area. The robot cleaner 100 does not initially have the cleaning map. The robot cleaner 100 may self-drive in the unknown area, for example, in a wall-following mode.

The controller 250 receives an image signal from the image sensor, and receives an obstacle sensor signal from the obstacle sensor 212. In addition, the controller 250 receives a sensor signal from at least one of the compass sensor 213, the acceleration sensor 214, or the gyroscope sensor 215.

In step S420, the controller 250 detects the existence of an obstacle and identifies a location of the obstacle based on at least one of an image signal from the image sensor or an obstacle sensor signal from the obstacle sensor 212. The obstacle sensor signal from the obstacle sensor 212 includes information on a distance to the obstacle and a direction of the obstacle.

In step S430, the controller 250 identifies a type of the detected obstacles based on the image signal from the image sensor. The controller 250 may identify a type of obstacles existing in the image signal based on an output of the object identifier 251. The controller 250 also determines the possibility of movement of the identified obstacles and the possibility of cleaning of the region of the identified obstacles.

The controller 250 may determine the possibility of movement of the obstacle with reference to the object property database. FIG. 5 illustrates an example of an object attribute database according to an embodiment of the present disclosure. The object attribute database stores the types of a plurality of objects that may exist in the indoor environment by associating the types of objects with their possibility of movement.

The controller 250 compares the possibility of movement of identified obstacles with reference to the object attribute database with a first reference value and a second reference value in order to determine the possibility of movement of the obstacles. The first reference value is a reference value for determining whether the obstacles are fixed obstacles or movable obstacles, and may be, for example, 20%. The second reference value is a reference value for determining whether the obstacles are temporary obstacles, and may be, for example, 80%.

The possibility of cleaning indicates whether the robot cleaner can drive or clean over or under the identified obstacles. The controller 250 may determine whether the robot cleaner may drive under or over the obstacle based on the obstacle sensor signal from the obstacle sensor 212. The controller 250 may also determine whether the robot cleaner can drive under or over the obstacles based on the image signal from the image sensor 212. Alternatively, the controller 250 may determine whether the robot cleaner can clean the top or bottom of the obstacle with reference to the object attribute database. At this time, the object attribute database further includes data of the possibility of cleaning associated with the types of objects.

The controller 250 detects a kitchen sink, and determines that the possibility of movement of the kitchen sink is lower than the first reference value. The controller 250 determines that the robot cleaner 100 cannot drive under or over the kitchen sink. Based on this determination, the controller 250 determines that the kitchen sink is a fixed obstacle, and the area of the kitchen sink is a non-cleanable obstacle area.

The controller 250 detects a dining table, and determines that the possibility of movement of the dining table is lower than the first reference value. The controller 250 determines that the robot cleaner 100 can drive under the table. Based on this determination, the controller 250 determines that the dining table is a fixed obstacle, and the area of the dining table is a cleanable obstacle area.

The controller 250 detects a chair, and determines that the possibility of movement of the chair is higher than the first reference value and lower than the second reference value. The controller 250 determines that the robot cleaner 100 can drive under the chair. Based on this determination, the controller 250 determines that the chair is a movable obstacle, and the area of the chair is the cleanable obstacle area.

The controller 250 identifies a bag on the floor, and determines that the possibility of movement of the bag is higher than the second reference value. The controller 250 determines that the robot cleaner 100 cannot drive under or over the bag. Based on this determination, the controller 250 determines that the bag is a temporary obstacle, and the area of the bag is a temporary obstacle area.

In step S440, the map manager 252 generates a cleaning map based on the location of the robot cleaner 100, the moving direction of the robot cleaner 100, the locations of the identified obstacles, and the type of identified obstacles. The location and the moving direction of the robot cleaner 100 may be identified based on at least one of a sensor signal from the compass sensor 213, the acceleration sensor 214, or the gyroscope sensor 215, or the information on the operation of the driving wheel 240.

The cleaning map includes information on the cleaning area where the robot cleaner 100 can drive. For example, the cleaning map includes two-dimensional coordinate data representing the cleaning area. The map manager 252 may divide the cleaning area into a plurality of sections, and determine a type of sections based on a type of obstacles existing in each section. For example, the map manager 252 may determine the type of sections in which a kitchen sink, a refrigerator, or a kitchen stove is detected as the kitchen. The map manager 252 may determine the type of sections where a bed is detected as a bedroom. The map manager 252 may determine the type of sections where a TV, a sofa, or a table is detected as a living room. The cleaning map may include information on the type and boundary of identified sections.

The cleaning map includes the type and location information of obstacles. The location information of the obstacles may include, for example, two-dimensional coordinates of the area occupied by the obstacles.

The cleaning map also further includes information on the possibility of movement of the obstacles and the possibility of cleaning of the areas of the obstacles. In the initially generated cleaning map, the values of the possibility of movement of the obstacles may be the same as the values obtained from the object attribute database. The values of the possibility of movement of the obstacles may be changed later by detecting the movement of the obstacles. The cleaning map may include data for classifying the areas occupied by the obstacles into, for example, any one of the non-cleanable obstacle area, the cleanable obstacle area, or the temporary obstacle.

In step S450, the controller 250 determines the cleaning path based on the generated cleaning map. The cleaning scheduler 254 initially determines the cleaning path based on the cleaning map. In particular, the cleaning scheduler 254 determines the cleaning path based on the movement possibility and the cleaning possibility existing on the cleaning map.

The cleaning scheduler 254 determines the cleaning path not to pass through the non-cleanable obstacle area and to pass through the area where the obstacle does not exist and the cleanable obstacle area. In this case, a separate cleaning pattern associated with the obstacle may be set in the cleanable obstacle area by a user input. In this case, the cleaning scheduler 254 determines the cleaning path according to the cleaning pattern set for the cleanable obstacle area.

Although the obstacles existed in the temporary obstacle area at the time of generation of the cleaning map, it is highly likely that no obstacles exist in the temporary obstacle area during the cleaning. Considering this aspect, it may be inefficient to determine the cleaning path so as not to pass through the temporary obstacle area. Therefore, the cleaning scheduler 254 may determine the cleaning path to pass through the temporary obstacle area.

Figure 6:
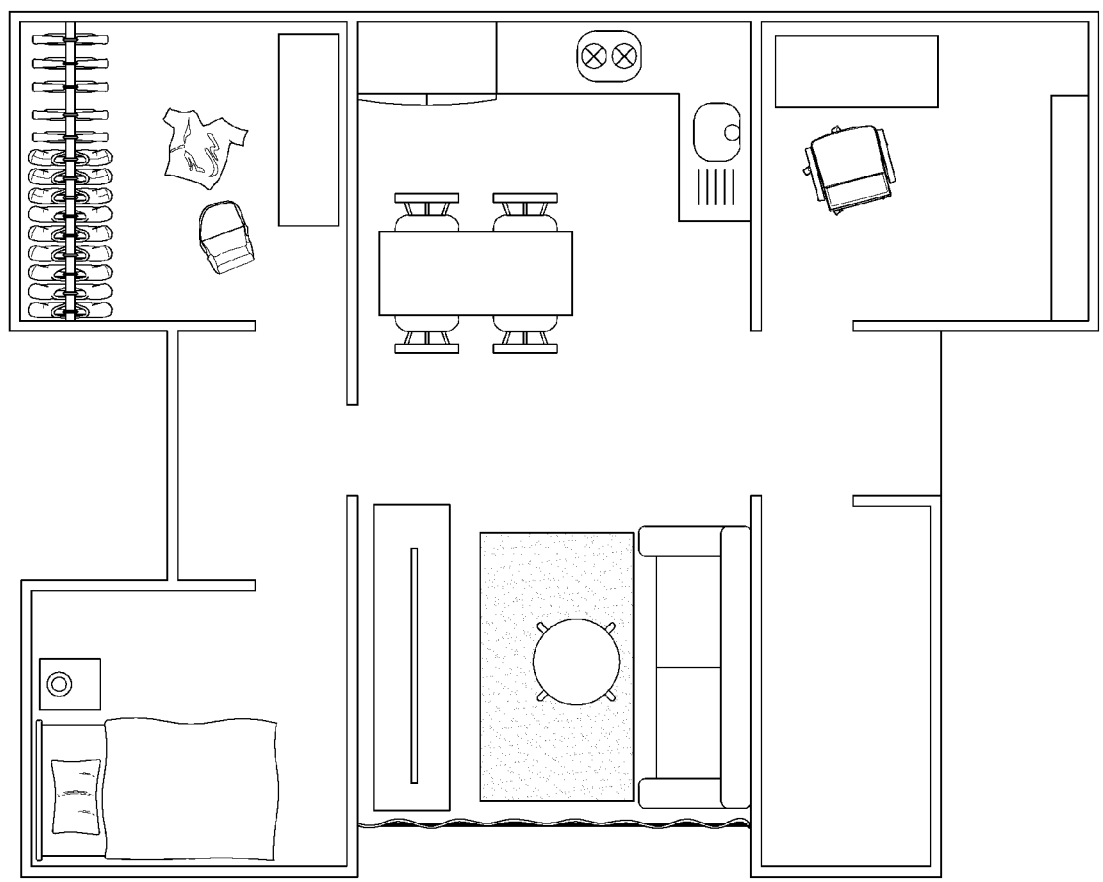
FIG. 6 is a diagram illustrating an example of a cleaning map displayed on a user terminal according to an embodiment of the present disclosure.

In step S460, the UI provider 253 provides the user terminal 170 with the user interface for displaying the cleaning map. FIG. 6 illustrates an example of a cleaning map displayed on a user terminal according to an embodiment of the present disclosure. The cleaning map displayed on the user terminal 170 illustrates a cleaning area where the robot cleaner 100 can drive along with images associated with identified obstacles. The image associated with the obstacle is displayed at the location on the cleaning map that corresponds to the location of the obstacle.

The images associated with the identified obstacles may be images of obstacles obtained by the image sensor, or may be predetermined images in association with the type of obstacles. For example, the predetermined images associated with the type of obstacles may be stored in the object attribute database. The UI provider 253 may provide the user terminal 170 with the images associated with the obstacles. Alternatively, the user interface may obtain the images associated with the type of obstacles from the user terminal 170 or from a third party server, and display the obtained images on the cleaning map.

The user interface provided to the user terminal 170 may display the cleaning path determined by the cleaning scheduler 254 on the cleaning map. When the robot cleaner 100 can drive over the obstacle, the cleaning path may be displayed on the image associated with the obstacle by a solid line. When the robot cleaner 100 can drive under the obstacle, the cleaning path may be displayed on the image associated with the obstacle by a dotted line.

In step S470, the controller 250 receives the user input for setting the cleaning path or modifying the cleaning area.

Figure 7:
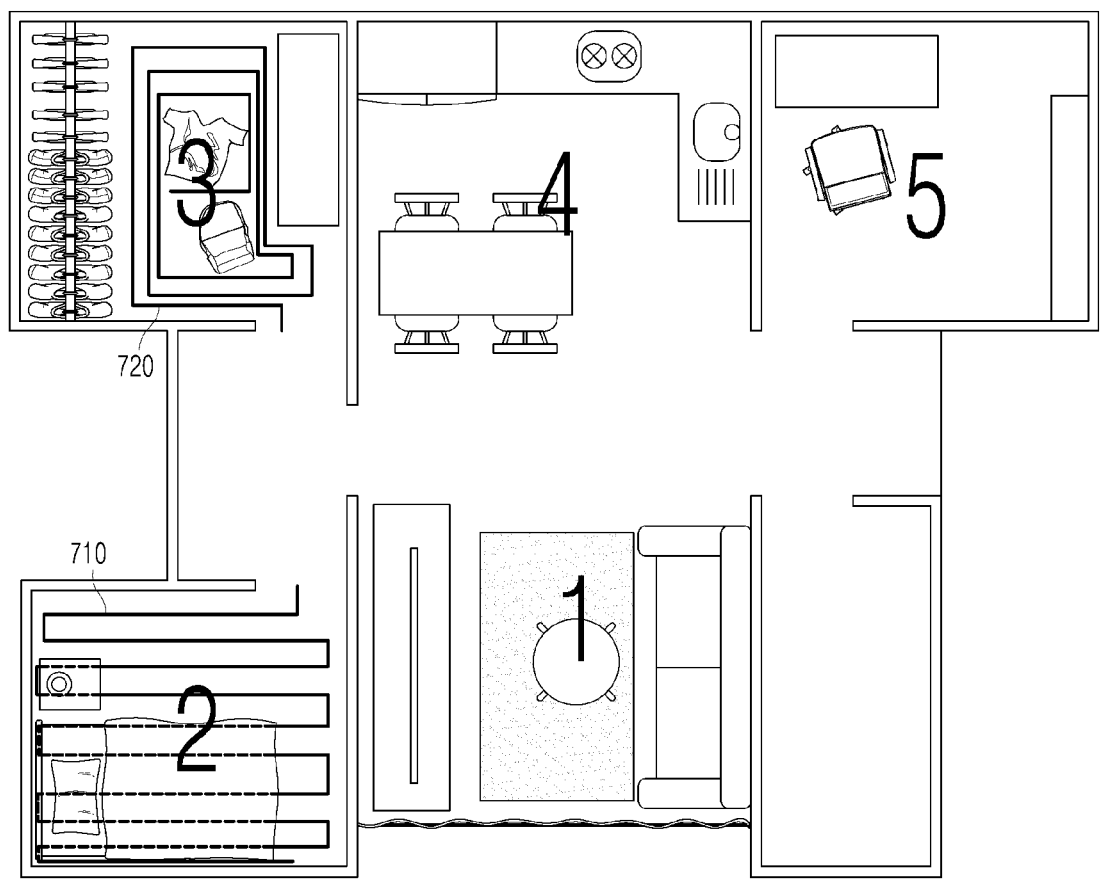
FIG. 7 is a diagram illustrating an example of a user interface for setting a cleaning order and cleaning patterns of a plurality of sections according to an embodiment of the present disclosure.

The user interface provided by the UI provider 253 may allow the user input for setting or modifying the cleaning path. The user may set the cleaning order and the cleaning patterns of the plurality of sections in the cleaning area through the user interface. FIG. 7 illustrates an example of a user interface for setting a cleaning order and cleaning patterns of a plurality of sections according to an embodiment of the present disclosure.

The user interface may allow the user to set the cleaning order of the sections in the cleaning area according to, for example, the order in which the sections of the cleaning map displayed on the touch screen of the user terminal 170 are touched. For example, the user may set the order to first clean a living room, and sequentially clean a bedroom, a dressing room, a kitchen, and a study.

The user interface may allow the user to set cleaning patterns of each section. For example, the user may set a cleaning pattern 710 of a bedroom in a zigzag pattern and a cleaning pattern 720 of a dressing room in a spiral pattern. The user interface allows the user to select any of the predetermined patterns (zigzag pattern, inward spiral pattern, outward spiral pattern, or the like) as the cleaning pattern, or the user to directly draw any cleaning pattern on the cleaning map.

Figure 8:
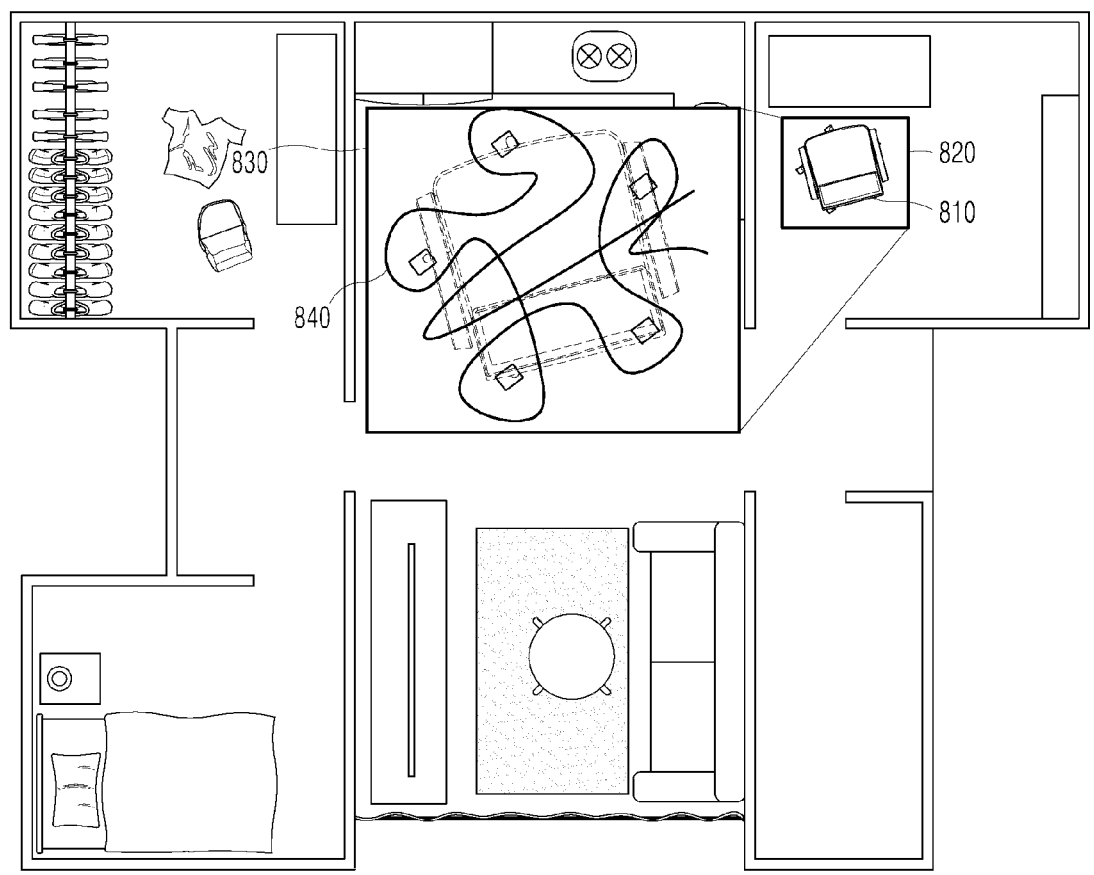
FIG. 8 is a diagram illustrating an example of a user interface for setting a cleaning pattern for an obstacle according to an embodiment of the present disclosure.

The user interface may allow the user to set a cleaning pattern associated with a particular obstacle. FIG. 8 illustrates an example of a user interface for setting a cleaning pattern for an obstacle according to an embodiment of the present disclosure.

For example, complex areas, such as areas between legs of a chair, can make it difficult for the cleaning scheduler 254 to set the cleaning pattern by itself. When the user touches an image 810 associated with a specific obstacle on the cleaning map displayed through the user interface, an input window 830 in which a cleaning pattern for an area 820 of the touched obstacle can be inputted is displayed. The user may input the cleaning pattern for the area of the obstacle by drawing a cleaning pattern 840 on the displayed input window 830.

Figure 9:
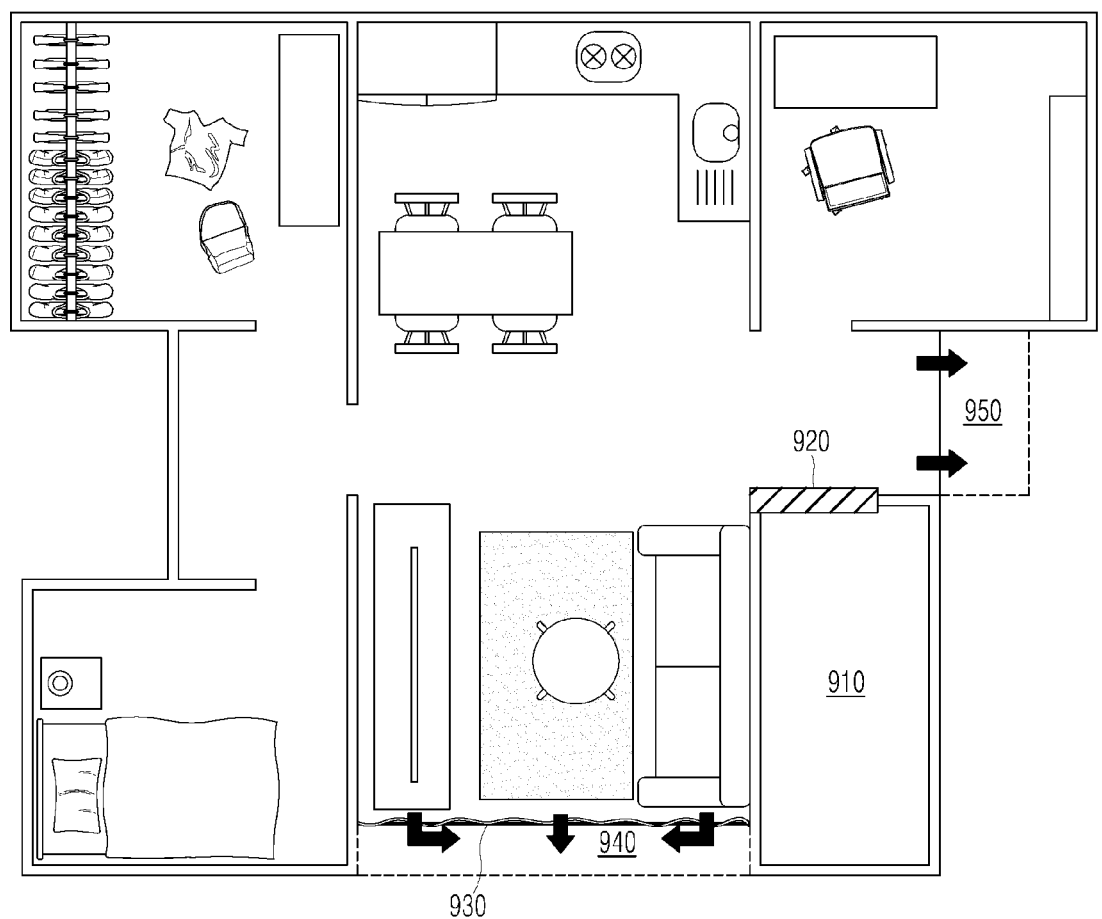
FIG. 9 is a diagram illustrating an example of a user interface for modifying a cleaning area of a cleaning map according to an embodiment of the present disclosure.

The user interface provided by the UI provider 253 may allow the user input for modifying the cleaning path on the cleaning map. FIG. 9 illustrates an example of a user interface for modifying a cleaning area of a cleaning map according to an embodiment of the present disclosure.

Modifying the cleaning area on the cleaning map includes excluding a portion of the cleaning area from the cleaning area (blocking a part of the cleaning area). The cleaning map generated by the map manager 252 includes a bathroom area 910 as a cleaning area, but a user may not want the bathroom area 910 to be cleaned. The user interface allows the user to set an entry prohibition 920 for some areas of the cleaning map.

Modifying the cleaning area includes including additional areas in the cleaning area (extension of the cleaning area). The user interface may allow the user to modify the cleaning area to extend beyond the determined cleaning area.

For example, the robot cleaner 100 determines that it cannot drive under a curtain 930, and does not explore the back of the curtain 930. The user knows that the robot cleaner 100 can drive to the back of the curtain 930 by driving under the curtain 930. The user extends the cleaning area of the cleaning map up to an area 940 behind the curtain 930 through the user interface. Similarly, the user can extend the cleaning area to clean the cleaning area of the cleaning map up to a step area 950 through the user interface.

The user interface may allow the user to set a cleaning duration, a repetition count, suction strength, and the like, for the sections of the cleaning area. In addition, the user interface may also allow the user to set a cleaning start time for the entire area or a cleaning start time for each section.

In step S480, the controller 250 determines a cleaning schedule including the cleaning start time, the cleaning duration, and the suction strength based on a user input.

The cleaning scheduler 254 may set or modify the cleaning path to pass through the plurality of sections in the cleaning area according to the cleaning order of the plurality of sections set by the user. In addition, the cleaning scheduler 254 may set or modify the cleaning path to clean each section according to the cleaning patterns in each section set by the user. The cleaning scheduler 254 sets or modifies the cleaning path to clean the area of the obstacle according to the cleaning pattern set by the user for a specific obstacle.

The cleaning scheduler 254 also determines the cleaning schedule to perform the cleaning according to the cleaning start time, the cleaning duration, and the suction strength set by the user.

In step S490, the controller 250 controls the operations of the suction blower 230 and the driving wheel 240 to allow the robot cleaner 100 to perform the cleaning according to the determined cleaning schedule.

The suction controller 255 controls the operation of the suction blower 230 to suck dust together with air according to the determined suction strength. The driving controller 256 controls the operation of the driving wheel 240 so as to drive the robot cleaner 100 according to the determined cleaning path.

Hereinafter, exemplary operations for performing cleaning according to the embodiments of the present disclosure will be described.

While the robot cleaner 100 is driving, the controller 250 receives the image signal from the image sensor and the obstacle sensor signal from the obstacle sensor 212 to identify the locations and type of obstacles. At this time, the obstacles identified as fixed obstacles are highly likely to exist in the area indicated on the cleaning map. The controller 250 may reduce the battery consumption of the robot cleaner 100 by reducing a frequency at which the image sensor or the obstacle sensor 212 senses fixed obstacles. Meanwhile, the controller 250 may reduce the value of the possibility of movement of the obstacle existing at the same location as the previously identified location. As a result, an obstacle which is initially determined as a movable obstacle can also be changed to a fixed obstacle over time.

The locations of the obstacles during the cleaning may be different from the locations of the obstacles at the time of the generation of the cleaning map. In particular, the locations of the movable obstacles during the cleaning may be highly likely to be different from the locations of the movable obstacles at the time of the generation of the cleaning map.

The controller 250 may detect that obstacles do not exist in the area where the obstacles did exist at the time of generating the cleaning map, based on at least one of the image signal or the obstacle sensor signal during driving for cleaning. If the obstacle is a movable obstacle, the obstacle is highly likely to exist at another location. Instead of deleting the information on the obstacle from the cleaning map, the map manager 252 may remove only the location information (area information) of the obstacle. This is in order to be able to reuse the information on the obstacle when the same obstacle is detected at different locations. In particular, when the user sets the cleaning pattern for the area of the obstacle, the set cleaning pattern can be applied to the same obstacle detected at different locations.

If no obstacle exists in the area where an obstacle existed at the time of generating the cleaning map, the cleaning scheduler 254 modifies the cleaning path of the area. That is, the cleaning scheduler 254 modifies the cleaning path to clean the area according to the cleaning pattern set for the corresponding section.

The controller 250 may detect obstacles in an area where obstacles did not exist at the time of generating the cleaning map, based on at least one of the image signal or the obstacle sensor signal during driving for cleaning. The controller 250 identifies the type of detected obstacles based on the image signal. The controller 250 identifies whether the detected obstacle is an obstacle which has been previously identified and included in the cleaning map.

If the detected obstacle is a new obstacle that has not been identified previously, the map manager 252 adds the information on the detected obstacle on the cleaning map, for example, the information on the type of obstacle, the possibility of movement of the obstacle, the possibility of cleaning, and the area of the obstacle. The cleaning scheduler 254 modifies the cleaning path for the area of the detected obstacle based on whether the robot cleaner 100 can drive over or under the detected obstacle.

If the detected obstacle is an obstacle that has been identified previously, the controller 250 may determine that the obstacle has moved from the previous location (area A) to the current location (area B). In this case, the map manager 252 changes the area information of the obstacle in the cleaning map to the area B, and increases the value of the possibility of movement of the obstacle. The cleaning scheduler 254 modifies the cleaning paths of the area A and the area B. That is, the cleaning scheduler 254 modifies the cleaning pattern of the area A to a cleaning pattern when no obstacle exists and the cleaning pattern of the B area to a cleaning pattern corresponding to the identified obstacle.

As such, in the embodiments of the present disclosure, when the obstacle in the cleaning area moves, it is possible to efficiently reset the cleaning path.

The robot cleaner 100 may attempt to drive to the cleaning area extended by the user. In the example of FIG. 9, the robot cleaner 100 attempts to drive to the back of the curtain 930 according to the user input, and if the robot cleaner 100 can drive to this area, the map manager 252 adds the area 940 that was covered by the curtain to the cleaning map.

Figure 10:
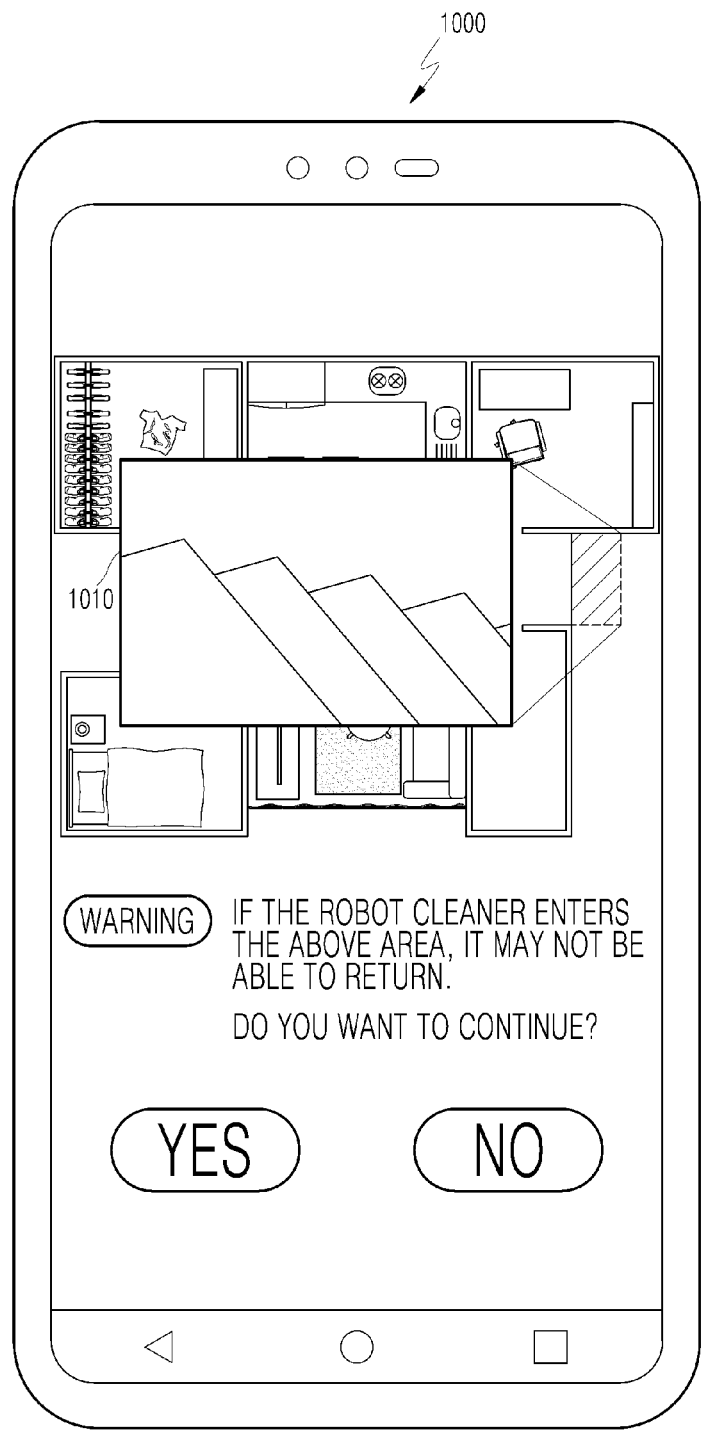
FIG. 10 is a diagram illustrating an example of a confirmation request message provided to a user terminal according to an embodiment of the present disclosure.

Meanwhile, the robot cleaner 100 attempts to drive to the step area 950 according to the user input. The controller 250 may determine that the robot cleaner 100 cannot return once it enters the step area 950 based on the obstacle sensor signal from the obstacle sensor 212. If it is determined that the robot cleaner 100 cannot enter an additional area according to the user input, the UI provider 253 transmits a confirmation request message to the user terminal 170. FIG. 10 illustrates an example of a confirmation request message provided to a user terminal according to an embodiment of the present disclosure. A confirmation request message 1000 may include an image 1010 of an additional area obtained from an image signal. The controller 250 may control the driving wheel 240 to enter an additional area according to a positive confirmation message from the user terminal 170 in response to the confirmation request message 1000, or exclude the additional area from the cleaning map according to a negative confirmation message from the user terminal 170.

In the above description, the methods of operating the robot cleaner 100 have been described as being executed by the controller 250 of the robot cleaner 100. However, the above-described methods may be performed by a processor of the home automation server 160 instead of the controller 250 of the robot cleaner 100. For example, the home automation server 160 may include a controller that receives sensor signals from the plurality of sensors 210 of the robot cleaner 100 and transmits control signals to the suction blower 230 and the driving wheel 240. The controller of the home automation server 160 may be configured to perform operations which are substantially the same as the operations of the controller 250 of the robot cleaner 100, for example, the operations of the object identifier 251, the map manager 252, and the user interface (UI) provider 253, the cleaning scheduler 254, the suction controller 255, and the driving controller 256.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A method for determining a cleaning path of a robot cleaner, the method comprising:
   detecting an obstacle based on at least one of an obstacle sensor signal from an obstacle sensor or an image signal from an image sensor;
   identifying a type of the obstacle based on the image signal;
   generating a cleaning map comprising information on the identified obstacle, the information on the obstacle comprising a location of the obstacle and the type of the obstacle;
   providing the cleaning map to a user terminal;
   receiving an input of a cleaning pattern for an area of the obstacle from the user terminal; and
   determining a cleaning path including the cleaning pattern for the area of the obstacle,
   wherein the cleaning map further comprises information on a fixed obstacle and information on an unfixed obstacle, and the information on the fixed obstacle comprises a display of the fixed obstacle and a location of the fixed obstacle, and the information on the unfixed obstacle comprises a display of the unfixed obstacle and a location of the unfixed obstacle,
   wherein the method further comprises:
   controlling the robot cleaner to drive along the cleaning path for cleaning; and
   obtaining a sensor signal using at least one of the obstacle sensor or the image sensor during driving for cleaning, and
   wherein an acquisition frequency of the sensor signal for the location of the fixed obstacle is lower than that of the sensor signal for the location of the unfixed obstacle.

2. The method according to claim 1, wherein the cleaning map is shown on the user terminal along with an image associated with the identified obstacle, and the image associated with the obstacle is shown at a location on the cleaning map corresponding to the location of the obstacle.

3. The method according to claim 1, wherein the cleaning map further comprises information on a temporary obstacle, and the information on the temporary obstacle comprises a display of the temporary obstacle and a location of the temporary obstacle, and
   in the determining of the cleaning path, the robot cleaner passes through the area of the temporary obstacle.

4. The method according to claim 1, further comprising:
   detecting a change in the location of the obstacle to which the cleaning pattern is assigned; and
   modifying the cleaning path by applying the cleaning pattern for the area of the obstacle to the changed location.

5. The method according to claim 1, further comprising:
   receiving a user input for setting the cleaning path from the user terminal, the setting of the cleaning path comprising setting of at least one of a cleaning order of a plurality of sections in a cleaning area or a driving pattern in the cleaning area; and
   determining the cleaning path based at least partially on the user input.

6. The method according to claim 1, further comprising:
   receiving a user input for modifying the cleaning area of the cleaning map from the user terminal,
   wherein the modifying of the cleaning area comprises at least one of including an additional area in the cleaning area or excluding a part of the cleaning area from the cleaning area.

7. The method according to claim 6, further comprising:
   determining that the robot cleaner is unable to enter the additional area based on at least one of the image signal or the obstacle sensor signal; and
   requesting the user terminal to confirm the entry of the robot cleaner into the additional area.

8. The method according to claim 1, wherein the method is performed by a server communicating with a controller of the robot cleaner or the robot cleaner through a network.

9. A computer-readable storage medium on which a computer program for determining a cleaning path of a robot cleaner is stored,
   wherein the computer program comprises instructions configured to perform the method according to claim 1 when executed by one or more processors.

10. A robot cleaner, comprising:
    an image sensor configured to generate an image signal;
    an obstacle sensor configured to generate an obstacle sensor signal;
    a network interface configured to communicate with a user terminal; and
    a controller,
    wherein the controller is configured to:
    detect an obstacle based on at least one of the obstacle sensor signal or the image signal;
    identify a type of the obstacle based on the image signal;
    generate a cleaning map comprising information on the identified obstacle, the information on the obstacle comprising a location of the obstacle and the type of the obstacle;
    provide a cleaning map to a user terminal through the network interface;
    receive an input of a cleaning pattern for an area of the obstacle from the user terminal; and
    determine a cleaning path including the cleaning pattern for the area of the obstacle,
    wherein the cleaning map further comprises information on a fixed obstacle and information on an unfixed obstacle, and the information on the fixed obstacle comprises a display of the fixed obstacle and a location of the fixed obstacle, and the information on the unfixed obstacle comprises a display of the unfixed obstacle and a location of the unfixed obstacle,
    wherein the controller is further configured to:
    control the robot cleaner to drive along the cleaning path for cleaning; and
    obtain a sensor signal using at least one of the obstacle sensor or the image sensor during driving for cleaning, and
    wherein an acquisition frequency of the sensor signal for the location of the fixed obstacle is lower than that of the sensor signal for the location of the unfixed obstacle.

11. The robot cleaner of claim 10, wherein the cleaning map is shown on the user terminal along with an image associated with the identified obstacle, and the image associated with the obstacle is shown at a location on the cleaning map corresponding to the location of the obstacle.

12. The robot cleaner of claim 10, wherein the cleaning map further comprises information on a temporary obstacle, and the information on the temporary obstacle comprises a display of the temporary obstacle and a location of the temporary obstacle, and wherein the controller is further configured to determine the cleaning path to allow the robot cleaner to pass through an area of the temporary obstacle.

13. The robot cleaner of claim 12, wherein the controller is further configured to:
   detect a change in the location of the obstacle to which the cleaning pattern is assigned; and
   modify the cleaning path by applying the cleaning pattern for the area of the obstacle to the changed location.

14. The robot cleaner of claim 10, wherein the controller is further configured to:
   receive a user input for setting the cleaning path from the user terminal, the setting of the cleaning path comprising setting of at least one of a cleaning order of a plurality of sections in a cleaning area or a driving pattern in the cleaning area; and
   determine the cleaning path based at least partially on the user input.

15. The robot cleaner of claim 10, wherein the controller is further configured to receive a user input for modifying the cleaning area of the cleaning map from the user terminal,
   wherein the modifying of the cleaning area comprises at least one of including an additional area in the cleaning area or excluding a part of the cleaning area from the cleaning area.

16. The robot cleaner of claim 15, wherein the controller is further configured to:
   determine that the robot cleaner is unable to enter the additional area based on at least one of the image signal or the obstacle sensor signal; and
   request the user terminal to confirm the entry of the robot cleaner into the additional area.

* * * * *